July 17, 1956 — L. C. HUCK — 2,754,703
METHOD OF RIVETING
Original Filed Dec. 29, 1945 — 2 Sheets-Sheet 1

INVENTOR.
Louis C. Huck.
BY Harness, Dickey & Pierce
ATTORNEYS.

July 17, 1956  L. C. HUCK  2,754,703
METHOD OF RIVETING
Original Filed Dec. 29, 1945  2 Sheets-Sheet 2
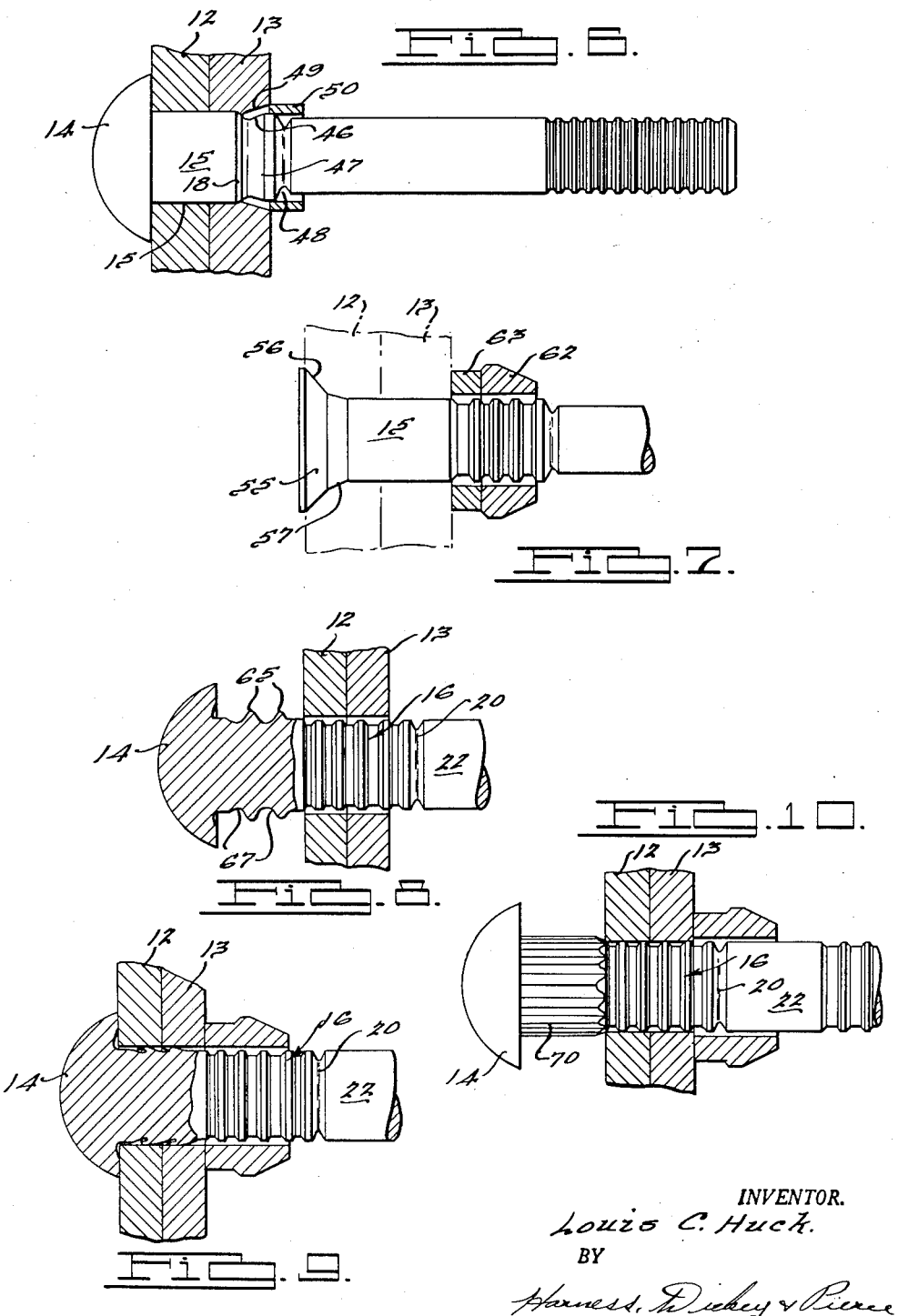
INVENTOR.
Louis C. Huck.
BY
Harness, Dickey & Pierce
ATTORNEYS.

United States Patent Office 2,754,703
Patented July 17, 1956

2,754,703

METHOD OF RIVETING

Louis C. Huck, Detroit, Mich., assignor to Huck Manufacturing Company, Detroit, Mich., a corporation of Michigan Original application December 29, 1945, Serial No. 638,081, now Patent No. 2,531,048, dated November 21, 1950. Divided and this application September 19, 1950, Serial No. 185,622

2 Claims. (Cl. 78—46)

The present invention relates to a method of fastening plate structures together and is a division of the copending application of Louis C. Huck, Serial No. 638,081, filed December 29, 1945, now Patent No. 2,531,048 issued November 21, 1950.

The present invention generally comprises a method of fastening a plurality of plates together by means of a two part fastener including a pin or bolt having a preformed head adapted to be inserted from one side of the work, and a collar on the bolt at the opposite side of the work which is to be locked to the bolt. The fastener is set by pulling the bolt and applying the reaction force to the collar, so that initially the plates are pulled tightly together and thereafter the collar is locked to the bolt by flowing metal into locking grooves in the bolt. Subsequently the bolt is broken under tension at a weaker section adjacent the collar. An object of the invention is to provide an improved method of fastening a plurality of plates together whereby the plates are first pulled tightly together and thereafter the fastener is set so that a tight joint is effected.

A further object of the invention is to provide an improved method of fastening a plurality of plates together whereby one of the fastener elements is placed under tension, which is termed tensile preload, when the fastener is set, so as to insure continued tightness of the fastener during use.

Other objects of the invention will become apparent from the following specification, from the drawings relating thereto, and from the claims hereinafter set forth.

For a better understanding of the invention, reference may be had to the drawings wherein:

Fig. 6 is also on the order of Fig. 1 but shows a fastener having a flush type collar or head;

Fig. 7 is a fragmentary view showing a fastener constructed according to another form of the invention;

Figs. 8 and 9 show a fastener having means for retaining it in an opening while initially applying the setting mechanism thereto; and, Fig. 10 is a view similar to Fig. 1 illustrating a fastener having axial corrugations.

Figures 1, 2:
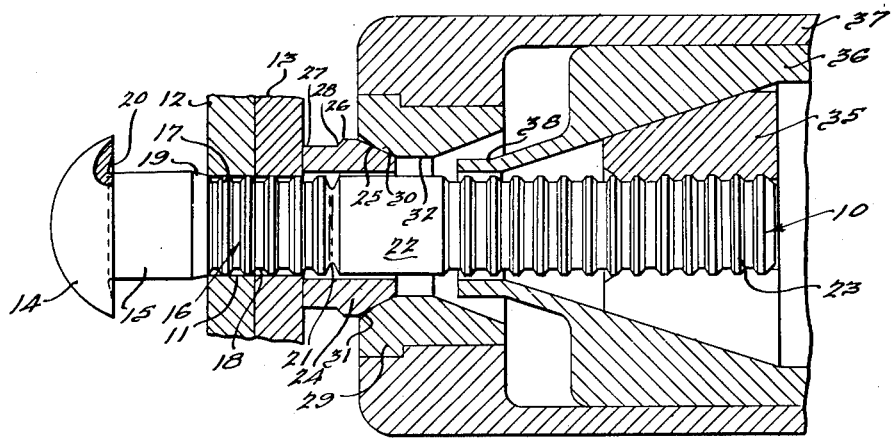
Figure 1 is a cross-sectional view illustrating a fastener assembled with the work prior to any rivet setting operation, in accordance with one form of the invention.
Fig. 2 illustrates the use of mechanism in setting the fastener shown in Fig. 1.

Referring to Fig. 1, the pin or locking bolt is indicated generally at 10 and is shown as extending through openings 11 in a pair of plates 12 and 13. The pin has a head 14 adapted to engage one side of the structure being fastened, a cylindrical hole filling portion 15 next to the head, and a grooved portion 16 next to the portion 15, having a series of annular ribs 17 and groove bottoms 18. The outer diameter of the ribs 17 is less than the outer diameter of the hole filling portion 15, and between the latter portion and the grooved portion 16, the shank has a conical taper or shoulder 19. It is desirable to use the fastener in structural openings smaller than the maximum diameter of the hole filling portion 15, but the openings should be slightly larger than the ribs 17 so that the pin may be easily inserted. Therefore, when the pin is manually inserted, the hole filling portion 15 will not enter the openings 11 and the pin is in the position shown by Fig. 1. In connection with head 14, an annular undercut or recess 20 is formed in the face thereof so as to provide a space to accommodate burrs or the like which possibly at times may be present at the edge of opening 11 in the plate 12. This allows the head to seat against the plate even though burrs may be present and also provides a space to accommodate "puckering" of plate 12 if the hole expands during hole filling.

At the end of the grooved portion of the pin, the latter has a groove or breakneck 21 of smaller diameter and this is the weakest part of the pin so that the pin will break under tension at this location before it will break under tension at any other location. Next to the breakneck, the pin has a cylindrical portion 22 of substantial length which may be of slightly reduced diameter as compared to the ribs 17 and this portion terminates at its outer end in a grooved gripping portion 23.

A second part of the fastener comprises a collar or head 24 which may be moved over the pin and located against the plate 13 as shown, and this collar is adapted to be radially contracted or swaged into the grooves 18 of the pin so as to lock the collar thereto and form a head against the plate. With particular reference to Fig. 1, the collar initially is formed with a conical surface 25 wherein the included angle of the cone is about 30°, and this surface at its larger end joins one end of a cylindrical surface 26. At the other end of the latter, the collar has a cylindrical surface 27 of smaller diameter as compared to the surface 26 and the two cylindrical surfaces are joined by a tapered shoulder 28. This construction of collar provides an annular bead constituting that portion of the collar whose diameter is greater than the diameter of surface 27. The opening in the collar is slightly larger than the ribs 17 and portion 21 of the pin to provide a desirable clearance which allows slight collar contraction without interfering with axial motion of the pin.

The fastener is set by means of riveting mechanisms on the order of that embodied in Patent No. 2,114,493, issued to Louis C. Huck, and this mechanism as shown by Fig. 1 herein, may comprise an anvil 29 having an inner frusto-conical surface 30 adapted substantially to fit the collar surface 25 and an outer frusto-conical surface 31 having an included cone angle of about 60°. At its smaller end, the angled surface 30 on the anvil joins a short cylindrical bore 32 and the length of the latter is such as not to provide an undesired frictional resistance to extrusion of the collar through the anvil. In order to grip the grooved portion 23 of the pin, jaws 35 are provided and these are adapted to be contracted and moved by a jaw contracting and moving sleeve element 36. When the jaws 35 and member 36 move to the right so as to pull the pin, the reaction to any pull is applied through a barrel or sleeve 37 and then through the anvil 29. After the pin 10 is inserted through the plates 12 and 13, as shown in Fig. 1, the collar 24 is located on the pin, and then the mechanism is moved over the pin until the grooved end portion 23 is located between the jaws 35. Initial operation of the mechanism causes the pin to be pulled and the flared mouth portion 30 of the anvil to move into contact with the conical surface 25 on the collar so as to press the collar against the plate 13.

With the collar against the plate 13 and the jaws gripping the pin, further pull on the pin will cause the hole filling portion to wiredraw down to a smaller diameter and move into the openings 11 in the plates and this continues until the head 14 reaches plate 12. It is to be realized however that depending upon relative hardness of metals involved, the hole filling portion of the pin may more or less wiredraw down to a smaller diameter and the opening may more or less expand accordingly. In any event the hole filling portion of the pin will have an interference fit in the opening or in other words, the fit will be such as caused by one interfering metal giving way to the other. During the foregoing procedure, the plates may be pulled together if separated since the collar is being pressed against plate 13 while the hole filling portion 15 is applying force against plate 12 due to the wiredrawing action. It is evident that the plate 12 in particular acts as a wiredrawing die when the shank portion 15 draws down to the original or to a somewhat expanded hole diameter.

With respect to hole filling, this result will be obtained providing the opening 11 is at least not larger than the shank portion 15 and regarding wiredrawing, the extent thereof will depend upon variable factors. In certain instances, the metal in the plates may be of such character that the openings 11 will expand or enlarge as the hole filling portion 15 moves through the plates. Again, variable degrees of wiredrawing and hole expansion may be obtained depending upon the relation of metals employed. It seems preferable, however, to have the hole filling portion of the pin characterized by a resistance to wiredrawing which is less than the resistance to expansion of the plate metal so as to effect wiredrawing of the shank portion at least largely. This is desirable as there naturally will be less distortion of the plates.

When the mechanism is initially actuated to pull the pin and apply the reaction to the collar 24, the anvil surface 30 alone will contact the surface 25 on the collar. As the pull on the pin and reaction force increases, the resistance of the collar to swaging movement of the anvil surface over the surface 25 will be overcome and the anvil surface 31 will progressively contact more of the surface 25 on the collar and in doing so, the angularity of the latter will progressively change to fit the anvil surface 31 until finally the collar fits both tapers on the anvil. During such movement of the anvil over the collar, the end of the latter also begins to extrude through the central opening 32 of the anvil. Generally, therefore, the resistance to such movement of the anvil increases during this early movement until both angles on the anvil fit the collar.

The extent of early movement of the anvil towards that position where both anvil surfaces first fit the collar depends upon the forces required to fill the hole. It may be that the anvil would not move or only a small amount during the hole filling stage in one instance, and in another, the anvil may move until both angles on the anvil fit the head. The sequential relation of hole filling and early anvil movement is not important providing appreciable swaging of the collar radially inwardly towards the pin, at least not to exceed the clearance between ribs 17 and the bore of the collar does not occur until the hole is filled and the plates are drawn tightly between the head and collar. In other words, it is not desired to effect locking of the collar to the grooved portion 16 of the pin until the hole is filled and the plates are drawn tightly together. In order to allow minor swaging movement of the metal towards the pin, such as that swaging which would occur until both angles on the anvil fit the collar, the latter has its opening sufficiently large as to provide enough clearance between the collar and pin to accommodate minor radially inward movement of the metal towards the pin without effecting any lock between the collar and pin.

It is desirable that the collar have a high initial resistance to swaging after it is reformed to fit both angles on the anvil and that this resistance be sufficient to allow the hole filling operation and drawing of the plates tightly together by the head 14 and collar before the swaged lock is effected. After the force on the anvil is sufficient to overcome this high initial resistance to swaging and to cause the bead on the collar to give way, it is desirable that the final resistance prior to engagement of the anvil with the plate 13 be substantially the same as or at least not much greater than said high initial resistance to swaging.

Variation in the high initial resistance to swaging may be effected by varying the diameter of the bead or by varying the axial location of taper 28 on the collar so as to vary the axial length of the bead on the collar or by varying both dimensions. The lenth of the base of the bead largely determines the high initial resistance to swaging and its length may be varied to secure the desired results. Variation in the final resistance to swaging may be effected by varying the diameter of the cylindrical portion 27 of the collar and a decrease in this diameter reduces the final resistance to swaging whereas an increase in diameter increases the final resistance to swaging. Once swaging is started after said high initial resistance to swaging is overcome, it will continue although the resistance will again increase during the final stage of movement of the anvil.

The swaged lock between the collar and the grooved portion 16 of the pin is effected after the pull on the pin and reaction force on the collar are sufficient to complete the hole filling operation and to draw and clamp the plates tightly together between the head 14 and collar, and it is apparent since the swaged lock is effected while the pin is under considerable tension, which is termed tensile preload, that the fastener will continue to hold the plates tightly connected. After the lock is effected, increased pull on the pin will break it at the breakneck 20 and thereafter operation of the mechanism is reversed so as to cause a nose 38 on the sleeve 36 to eject the collar from the anvil.

The same operation may be effected even though the total thickness of plates 12 and 13 vary considerably since the substantial length of the grooved portion 16 will still insure locking of the collar to one or more grooves. If the plates were decreased in thickness from that shown, the broken end of the pin would project outwardly from the collar whereas any increase in the thickness of the plates would cause the breakneck to be located axially within the collar. The fastener may thus be used for connecting structures wherein the thickness of the latter varies through a substantial range. While the anvil 29 is shown as having the two angles 30 and 31, under certain conditions it may be desirable to have a single angle 30 so that the latter would fit the entire collar surface 25 initially.

Figure 3:
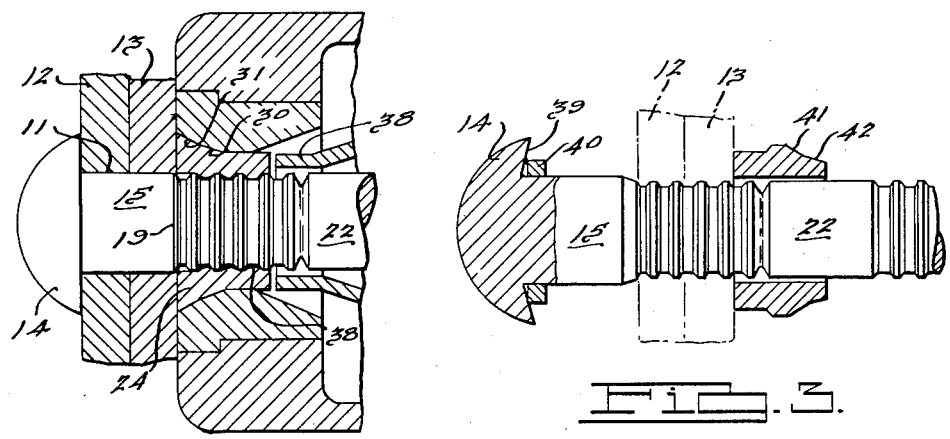
Figs. 3, 4 and 5 are views similar to Fig. 1 illustrating fasteners constructed according to other forms of the invention.

The construction shown by Fig. 3 is substantially similar to that shown by Fig. 1 excepting that the head 14 has an undercut 39 which provides space for an annular sealing ring 40 formed from rubber or other suitable material such as soft metal subject to plastic deformation, which may be desired under certain conditions as for instance where the hole in the plates happens to be larger than the pin portion 15. The fastener is set in the same way but in this case, the sealing ring will be flattened and strongly brought into sealing contact both with the pin and plate 12 before the head directly engages the plate. Preferably and in order to insure direct contact of the outer portion of the head with the plate 12, the volume of the space defined by the undercut in the head is greater than the volume of the ring.

Also in this figure the collar 24 is initially formed with two conical surfaces 41 and 42 shaped to fit the anvil surfaces 30 and 31. Hence, in this case the anvil would not initially move to reform the surface of the collar to fit the anvil surfaces but would fit such surfaces as soon as the anvil moves against the collar.

Figure 4:
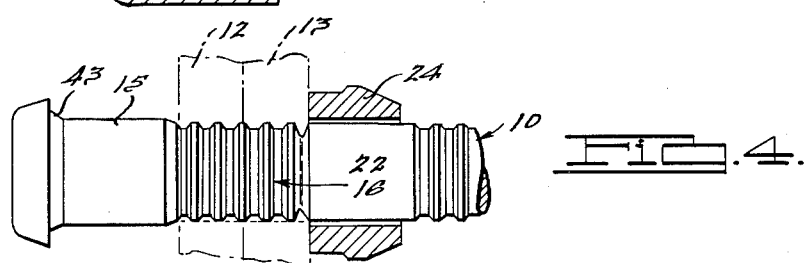

In the construction shown by Fig. 4, a different head is provided on the pin and this head joins the hole filling portion 15 by means of a frusto-conical portion 43. When this fastener is set, the frusto-conical portion 41 is forced into the end of the opening in plate 12, and this may be desirable in the event a positive metal seal is desirable.

Figure 5:
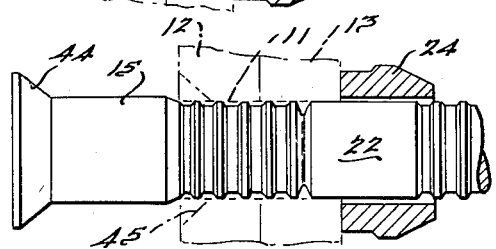

In Fig. 5 the fastener has a frusto-conical head 44 and in this case the opening in plate 12 will be countersunk as indicated at 45 so as substantially to fit the head and provide a flush condition, or again the plates could be dimpled to provide the recess for the head.

Now referring to Fig. 6, the fastener shown in this figure is adapted particularly to effect flush riveting at that side from which the bolt is driven or pulled. In this case, the pin may have different preformed heads but is shown as having the same head as indicated at 14 in Fig. 1. Also the pin has a hole filling portion 15 such as in Fig. 1 and next to the portion 15, it has an annular locking groove 46. This locking groove joins a cylindrical land 47 which is next to a breakneck groove 48. The plate 13 is provided with a countersunk recess 49 adapted to receive a collar 50, and the recess in conjunction with the locking groove 46 forms a locking space into which the collar may be forced.

In setting this fastener, a different type of setting mechanism may be employed which may correspond generally to that shown in Fig. 9 of Patent No. 2,053,719. Initially, the reaction force is applied to the sheet 13 by means of an outer anvil and then after the pull on the pin and the reaction force reach a certain amount necessary to cause the hole to be filled and the plates drawn tightly together, continued pull on the pin causes the collar to be forced into the locking recess while the pin is under tension and with the head 14 and collar strongly holding the plates together. Thereafter, increasing pull on the pin will break it at the breakneck 48.

Fig. 7 shows a bolt having a head 55 of frusto-conical form adapted to seat in a countersunk recess 56 in plate 12 and additionally the bolt has a flared portion 57 generally corresponding to the flared portion 41 in Fig. 4 which is adapted to seal the end of the pin in the opening as it forces its way into the opening. Also in this construction, the collar is shown divided at the end of the bead to provide two parts indicated at 62 and 63, which jointly correspond to the collar 24 previously shown. This collar is adapted to be swaged by the anvil in the same manner as previously described. Dividing the collar enables substituting collar sections of varying diameters for the section 63 and thereby varying the swaging resistances. Also various sizes of sections may be substituted for section 62 for similar reasons and also to facilitate fabrication.

According to Fig. 8, the pin instead of having a hole filling portion 15 as previously described, has one or more annular beads 65 in the pin portion adapted to be located in the plate openings. This form of the invention is adapted to be used particularly where the operator cannot by hand hold the headed end of the pin in place while applying the mechanism to the other end of the pin. The ribs or beads are of such character that by striking the head 14 in Fig. 8 with a hammer or the like, the beaded portion of the pin can be driven into the hole so as to hold the pin in place as seen in Fig. 9. During this driving of the pin into the openings, the beads bend over as seen in Fig. 9 but necessarily have a strong frictional lock with the side wall defining the opening so as to prevent the pin from falling out when the mechanism is applied to the grooved end of the pin. For instance, the pin may be inserted in large plates from one side and lodged therein by a hammer blow and then the operator can go to the other side of the plates and apply the mechanism. The beads may be formed by rolling operations which form the beads and simultaneously form annular grooves indicated at 67 and such grooves provide a space into which the beads may bend as seen in Fig. 9.

In Fig. 10, the pin is similar to that shown in Fig. 1 excepting that it has the hole filling portion provided with axial ridges or corrugations 70. When this bolt is applied, the ridges individually are flattened out circumferentially as they move into the opening and the metal flows or moves into the valleys between the ridges. Depending upon the size of the opening, more or less ridge metal will flow into the valleys and if the opening is of optimum size it should substantially be filled. Preferably the relation of the metal hardness in the plates and pin is such that the ridges will flatten and fill the valleys and then wiredraw down or expand the hole if necessary before either cutting of the plates by the ridges or shearing of the ridges by the edge of the plate opening will occur.

Although more than one form of the invention has been illustrated and described in detail, it will be apparent to those skilled in the art that various modifications may be made without departing from the scope of the claims.

What is claimed is:

1. The method of fastening a plurality of plate elements having aligned openings together comprising inserting a pin, having external, annular grooves along a portion thereof and having an integral abutment, through said openings so that said abutment engages the outer face of one of said plate elements adjacent its opening and so that an axial portion of said pin engages the walls of said openings with the end of said pin opposite to said abutment projecting through and beyond said openings, and with the annular grooves disposed beyond and adjacent the opening of the other plate element, applying a collar over said opposite end of said pin and against the face of the adjacent plate element, pulling said opposite end of the pin and applying a reaction force to the collar to first pull the plate elements together and clamp them between the collar and abutment, applying a tensile pre-load on the pin and then to swedge the collar into interlocking engagement with said grooves, to thereby lock said collar against axial displacement with respect to said pin.

2. The method of fastening a plurality of plate elements having aligned openings together comprising inserting a pin, having external, annular grooves along a portion thereof and having an integral abutment, thorugh said openings so that said abutment engages the outer face of one of said plate elements adjacent its opening and so that an axial portion of said pin engages the walls of said openings with the end of said pin opposite to said abutment projecting through and beyond said openings, and with the annular grooves disposed beyond and adjacent the opening of said plate elements, applying a collar over said opposite end of said pin and against the face of the adjacent plate element, pulling said opposite end of the pin and applying a reaction force to the collar to first pull the plate elements together and clamp them between the collar and abutment, applying a tensile pre-load on the pin and then radially swedging the collar into interlocking engagement with said grooves by means of the reaction force to thereby lock the collar against axial displacement with respect to the pin while maintaining a tensile pre-load on the pin.

References Cited in the file of this patent

UNITED STATES PATENTS

| Re. 22,792 | Huck | Sept. 17, 1946 |
| 1,968,516 | Dieter | July 31, 1934 |
| 2,008,229 | Sharp | July 16, 1935 |
| 2,024,071 | Taylor et al. | Dec. 10, 1935 |

(Other references on following page)

UNITED STATES PATENTS

| | | |
|---|---|---|
| 2,056,309 | Osenberg | Oct. 6, 1936 |
| 2,061,629 | Huck | Nov. 24, 1936 |
| 2,114,493 | Huck | Apr. 19, 1938 |
| 2,132,112 | Huck | Oct. 4, 1938 |
| 2,132,113 | Huck | Oct. 4, 1938 |
| 2,298,203 | Ekland | Oct. 6, 1942 |
| 2,396,661 | Keller et al. | Mar. 19, 1946 |
| 2,397,076 | Keller et al. | Mar. 19, 1946 |
| 2,397,111 | Huck | Mar. 26, 1946 |
| 2,466,811 | Huck | Apr. 12, 1949 |
| 2,527,307 | Huck | Oct. 24, 1950 |
| 2,531,048 | Huck | Nov. 21, 1950 |
| 2,531,049 | Huck | Nov. 21, 1950 |